US012375297B2

(12) United States Patent
Stucchi

(10) Patent No.: US 12,375,297 B2
(45) Date of Patent: Jul. 29, 2025

(54) DISTRIBUTED CRYPTOGRAPHIC SYSTEM TO ARCHIVE DATA COMPRISING A MULTIPLICITY OF AUTONOMOUS SETS OF BLOCKCHAINS

(71) Applicant: Antonio Stucchi, Uboldo (IT)

(72) Inventor: Antonio Stucchi, Uboldo (IT)

( * ) Notice: Subject to any disclaimer, the term of this patent is extended or adjusted under 35 U.S.C. 154(b) by 156 days.

(21) Appl. No.: 18/282,315

(22) PCT Filed: Mar. 14, 2022

(86) PCT No.: PCT/IB2022/052272
§ 371 (c)(1),
(2) Date: Sep. 15, 2023

(87) PCT Pub. No.: WO2022/195448
PCT Pub. Date: Sep. 22, 2022

(65) Prior Publication Data
US 2024/0163113 A1 May 16, 2024

(30) Foreign Application Priority Data
Mar. 16, 2021 (IT) .......................... 102021000006242

(51) Int. Cl.
*H04L 9/32* (2006.01)
*G06F 16/22* (2019.01)
*H04L 9/00* (2022.01)

(52) U.S. Cl.
CPC ............ *H04L 9/3263* (2013.01); *G06F 16/22* (2019.01); *H04L 9/50* (2022.05)

(58) Field of Classification Search
CPC ..... H04L 9/50; H04L 9/3236; H04L 2209/56; H04L 9/3247; G06F 21/6245; G06F 16/182; G06F 16/278
See application file for complete search history.

(56) References Cited

U.S. PATENT DOCUMENTS 11,093,933 B1 * 8/2021 Peng ..................... H04L 9/3239
2017/0132626 A1 * 5/2017 Kennedy .............. G06Q 20/065
(Continued)

FOREIGN PATENT DOCUMENTS

WO    WO-2018232493 A1    12/2018

OTHER PUBLICATIONS

International Search Report and Written Opinion issued May 25, 2022 in PCT/IB2022/052272, 14 pages.

*Primary Examiner* — Olugbenga O Idowu
(74) *Attorney, Agent, or Firm* — Element IP, PLC

(57) ABSTRACT

A method for archiving data in a distributed cryptographic database includes writing data to a data archive of a data block of an autonomous data blockchain, linking the data block with a control block of an autonomous control blockchain, the control block including a time stamp more recent than a time stamp of the data block with which it is linked, and, when the written data is to be cancelled, inserting a first status value and a second status value inside a following data block linked to the data block including data by a pair of cryptographic links, thus defining that, from a certain block of the autonomous data blockchain onwards, a valid second status value indicates that the data archive is empty, and validating the second status value in a following control block of the autonomous control blockchain with a time stamp.

9 Claims, 5 Drawing Sheets

(56) References Cited

U.S. PATENT DOCUMENTS

| | | | |
|---|---|---|---|
| 2019/0018888 A1* | 1/2019 | Madisetti | G06F 16/27 |
| 2019/0081793 A1* | 3/2019 | Martino | H04L 9/0894 |
| 2019/0266145 A1* | 8/2019 | Qiu | G06Q 20/02 |
| 2019/0340266 A1 | 11/2019 | Vo et al. | |
| 2020/0136847 A1* | 4/2020 | Serwatowski | H04L 9/3297 |
| 2020/0278958 A1* | 9/2020 | Zhang | G06Q 20/3678 |
| 2022/0393881 A1* | 12/2022 | Ow | G06Q 20/3678 |

* cited by examiner

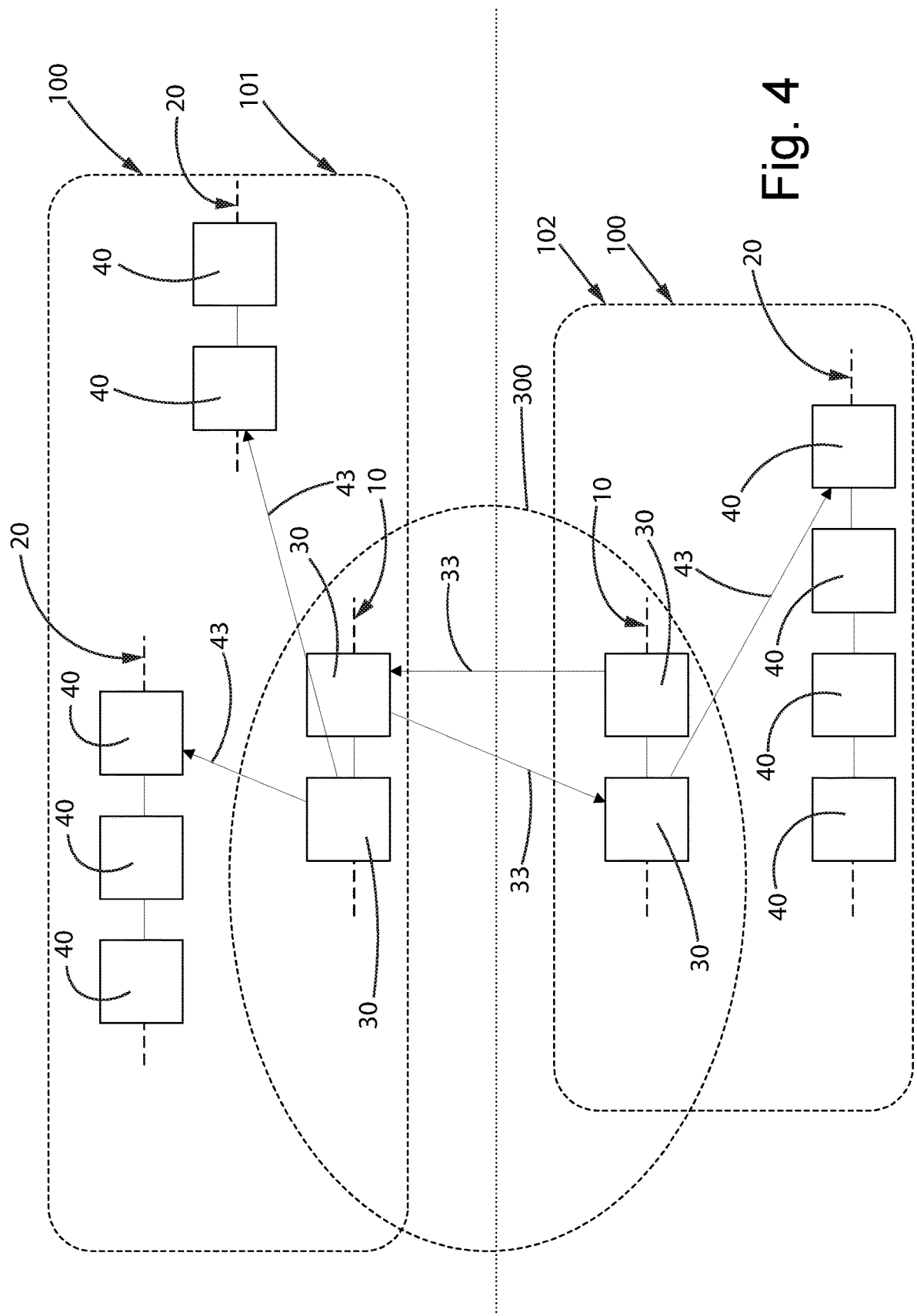

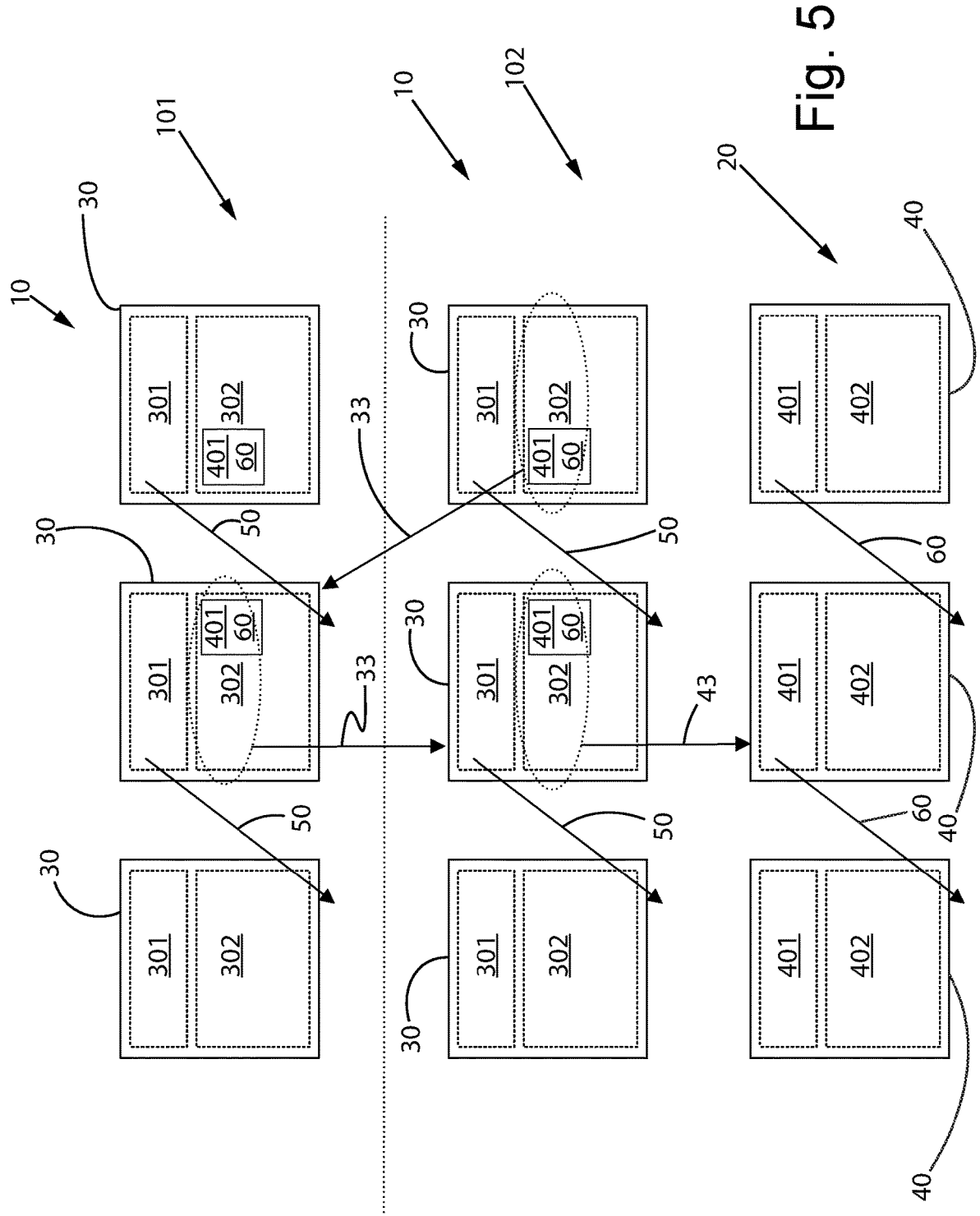

DISTRIBUTED CRYPTOGRAPHIC SYSTEM TO ARCHIVE DATA COMPRISING A MULTIPLICITY OF AUTONOMOUS SETS OF BLOCKCHAINS

The present invention relates to a distributed cryptographic system to archive data comprising a multiplicity of autonomous sets of blockchains.

In the state of the art, a blockchain is known to be a growing list of records that are basic data structures called blocks. The blocks of the blockchain are concatenated together in chronological order and are logically represented as a blockchain. Each block comprises a cryptographic link to a previous block, called a cryptographic hash, a time stamp, and at least one data. The cryptographic link links the two contiguous blocks. The blockchain resists changes to its data, in fact once a data is recorded in one of the blocks of the blockchain it can no longer be altered retroactively without altering all the following blocks. This allows all participants in the blockchain to independently verify the veracity of the transaction data. In distributed or consortium blockchains, all participants are at the same hierarchical level and can send and receive information without filters.

In distributed or consortium blockchains, each single block must be validated by all participants in the blockchain.

Disadvantageously, any type of blockchain does not allow to cancel a data once it has been inserted into a block.

Disadvantageously, any type of blockchain does not allow a participant to be able to autonomously manage its own information flow.

Disadvantageously, the centralised or decentralised blockchains suffer from a logical single point of failure and are potentially attackable (DOS/DDOS), they also suffer by their nature from the control of the entire database, both from a data point of view and from the point of view of the infrastructure underlying the data, by a single entity.

Disadvantageously, a consortium blockchain is itself the definition of an agreement between nodes throughout a network of participants linked peer-to-peer with each other and does not offer the same level of immutability as the distributed type blockchain.

All these features, combined with the compliance with international regulations such as the privacy rules GDPR, with the right to be forgotten and to data retention, or HIPAA Health Information Privacy, with the data accessibility management, just to name the most well-known ones, have made it impossible for blockchains to be widely adopted in enterprise environments and for non-financial applications.

Disadvantageously, each node participating in the blockchain has a complete copy of all data and each single block of the blockchain must be validated by the entire network of participants to become part of the distributed blockchain, these reasons make the blockchain a database model with limited scalability both from the point of view of size, as well as in terms of speed in processing new transactions, de facto banishing the adoption of blockchains as a database for data management as it happens today with generic DBMS/RDBMS type databases in use in all enterprises, i.e. for non-financial applications.

Disadvantageously, even managing data through cryptography, in the presence of certain types of information subject to regulation or due to the confidentiality of the data itself, anything that is exposed beyond the internal perimeter of the company as well as, for example, the use of cloud services offered by known subjects is classified as unreliable by some existing standards.

It therefore becomes essential to review the logic underlying the current blockchain models in order to define new solutions that guarantee characteristic aspects such as data immutability, made possible also thanks to the collaboration between different nodes/participants, and data verifiability by anyone in an unambiguous way, but which at the same time solve all those shortcomings that to date have limited a more generalised use of blockchains in non-financial type applications.

The object of the present invention consists in the fact of realizing a cryptographic system to archive data comprising a multiplicity of sets of blockchains that ensures data immutability in a distributed manner, also made possible thanks to the collaboration between different nodes/participants, and data verifiability by anyone in an unambiguous manner, but which at the same time solves all the drawbacks of the state of the art that have limited a more generalised use of blockchains in non-financial type applications.

According to the invention, this object is achieved with a distributed cryptographic system according to claim 1.

Other features are provided in the dependent claims.

The features and advantages of the present invention will be more apparent from the following description, which is to be understood as exemplifying and not limiting, with reference to the appended schematic drawings, in which:

FIG. 1 is a schematic view of a cryptographic system to archive data according to the present invention comprising a multiplicity of sets of blockchains, wherein at least one set comprises an autonomous data blockchain and an autonomous control blockchain and the remaining sets of blockchains may comprise an autonomous data blockchain and at least one autonomous control blockchain, each set of blockchains is self-managed by one of the multiple participants of the cryptographic system, wherein each participant adds new blocks independently of the other participants in its autonomous data blockchain and in its autonomous control blockchain;

FIG. 4 is a diagram of two sets of blockchains with a possible embodiment pattern;

FIG. 5 is a detailed diagram of two sets of blockchains, wherein the steps of making the data immutable and verifiable through inter-blockchain links are described.

Figure 1:
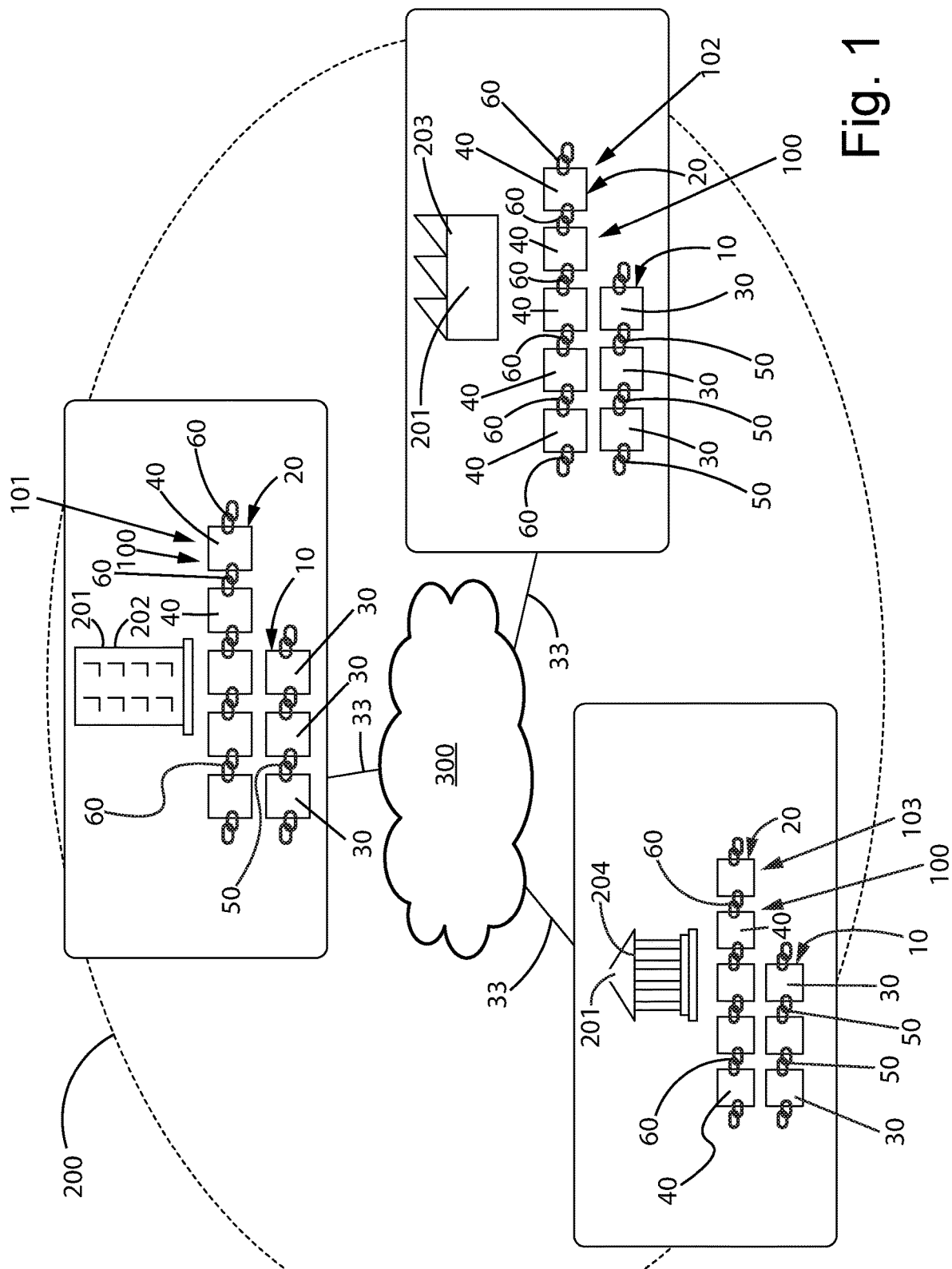

With reference to the mentioned figures, a cryptographic system 200 to archive data comprising a multiplicity of sets of blockchains 100 is shown. Each set of blockchains 100 is managed by at least one participant 201.

Each set of blockchains 100 is managed by at least one participant 201 and is in communication with the other sets of blockchains 100 managed by the other participants 201 through a computer network 300 either Internet to link a multiplicity of participants 201 or intranet to link a multiplicity of participants 201 that are internal to a company 203 or public entity 204 or private user 202.

Advantageously, there is no need for an additional virtual layer provided by the peer-to-peer network because the client/server communication is sufficient for the system to achieve its purposes.

FIG. 1 shows, for example, three participants 201, each of which manages only one set of blockchains 100. The depicted participants 201 are, for example, a household utility 202 that manages a first set of blockchains 101, an enterprise 203 that manages a second set of blockchains 102, and a public entity 204 that manages a third set of blockchains 103. Each participant 201 autonomously manages its own set of blockchains 100.

A single participant 201 is defined as a single user or a group of users, which may be the family members of a household utility 202, or the employees of an enterprise 203 or the employees and/or the users of a public entity 204.

Returning to the main embodiment example, at least one set 100 comprises an autonomous data blockchain 20 and an autonomous control blockchain 10 and the remaining sets of blockchains 100 may comprise an autonomous data blockchain 20 and at least one autonomous control blockchain 10. It can be contemplated that one or more sets of blockchains 100 comprise only one autonomous control blockchain 30.

For example, FIG. 1 shows a single autonomous control blockchain 10 and a single autonomous data blockchain 20 for each set of blockchains 100.

The control blockchain 10 comprises a series of control blocks 30, a series of cryptographic links 50 linking in series and chronological order said control blocks 30.

Said at least one autonomous data blockchain 20 comprises a series of blocks 40, a series of pairs of cryptographic links 60 linking in series and in chronological order said blocks 40.

Said autonomous blockchains, which in FIG. 1 are disconnected from each other, just to make this high-level representation more readable, are instead also linked to each other as shown in FIGS. 4 and 5.

As shown in the figures the autonomous data blockchain 20 is substantially developed as a blockchain of the state of the prior art in compliance with the model of the chain of blocks 40, which in turn are organised into fields, continuously growing and serially linked together in chronological order from the least recent to the most recent, through the application of cryptographic algorithms, but one of the fundamental differences with respect to a blockchain of the state of the prior art is the pair of cryptographic links 60 between the blocks 40.

Figure 2:
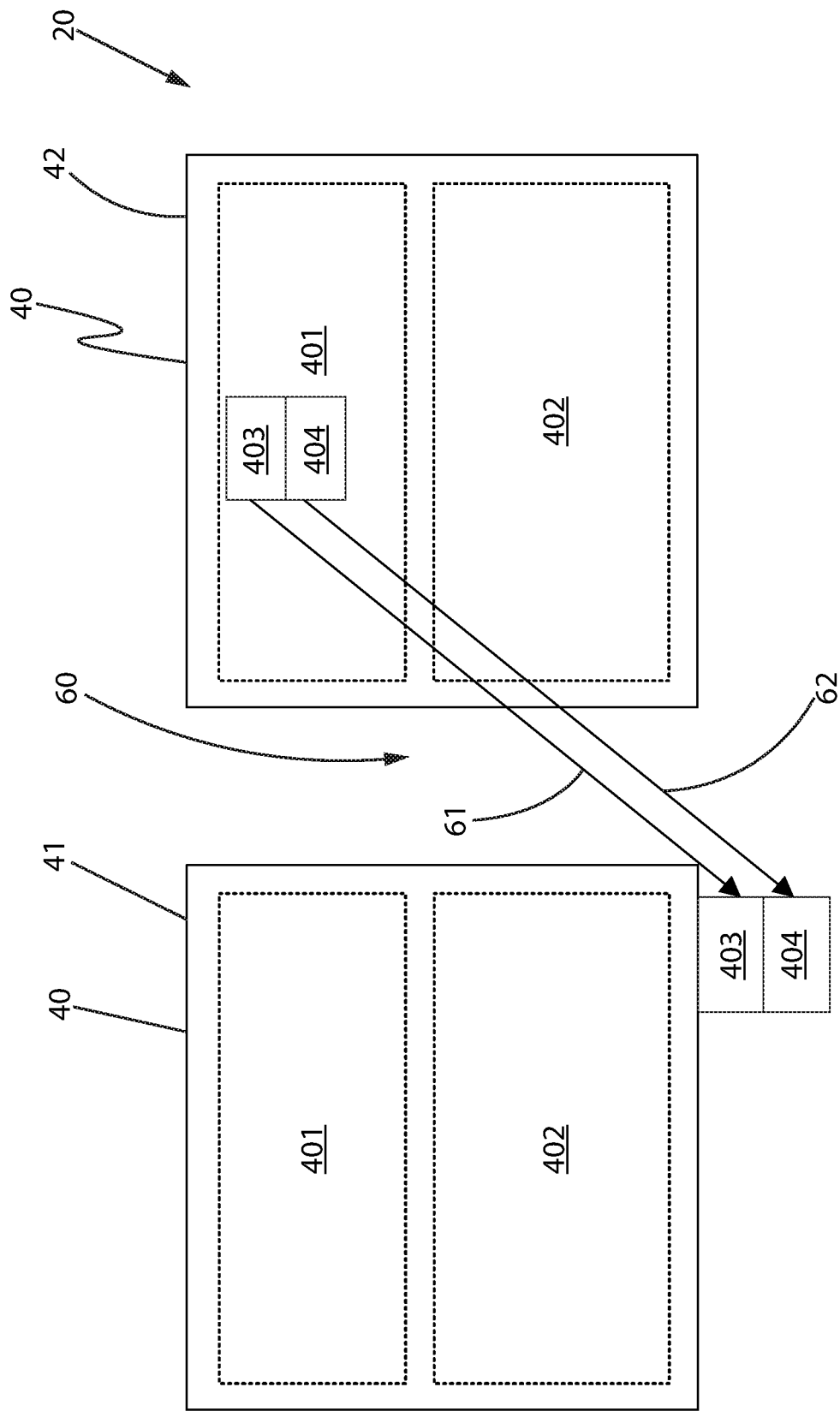
FIG. 2 is a diagram of two contiguous blocks of the autonomous data blockchain which are linked by a pair of cryptographic links.
Figure 3:
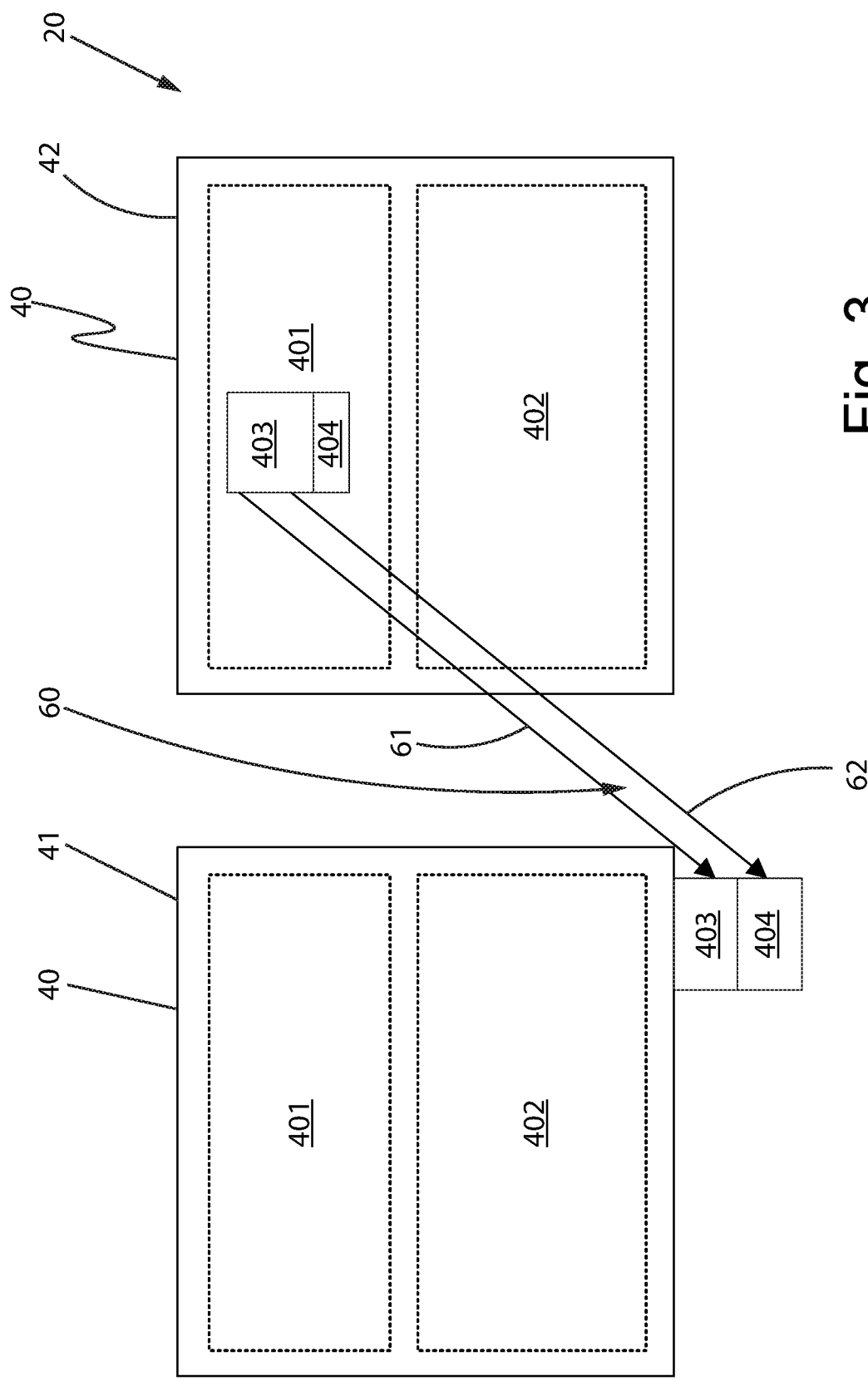
FIG. 3 is a diagram of two contiguous blocks of the autonomous data blockchain which are linked by a pair of cryptographic links linked in a different diagram from FIG. 2.

As shown particularly in FIGS. 2 and 3, the autonomous data blockchain 20 comprises a series of blocks 40 serially linked together in chronological order, such that a following block 42 is more recent than a previous block 41. The previous block 41 and the following block 42 are two contiguous blocks 40 of the series of blocks 40 and are linked to each other by a pair of cryptographic links 60.

Each block 40 of said series of blocks 40 comprises titling data 401 comprising at least one index, at least one time stamp, a blockchain name, a data archive 402, a first status 403 of the archive 402, and a second status 402 of the archive 402.

The first status 403 indicates that said archive 402 comprises at least one archived data.

The second status 404 indicates that said archive 402 is empty.

Advantageously, it is possible to automate data cancellation by providing a field contained within the blocks in which it is possible to enter the period of validity, or alternatively the expiration, beyond which the data archived within the block itself can be considered no longer valid and therefore eliminable.

Advantageously, the cryptographic system 200 allows to comply with the right to be forgotten, the data retention as defined by the requirements described by the European regulation for privacy GDPR, to be able to cancel any data and to provide maintainability with respect to a data that is no longer valid thanks to the multiple cryptographic link 60 between contiguous blocks 41, 42 and to the information contained in each block 403, 404 dedicated to the validity of the data.

The series of blocks 40 comprises at least one previous block 41 and at least one following block 42 which is more recent than said previous block 41. The previous block 41 and the following block 42 are contiguous blocks 41, 42 of the series of blocks 40. The contiguous blocks 41, 42 are linked to each other by a pair of cryptographic links 60 of said series of pairs of cryptographic links 60.

As shown in FIG. 2, the pair of cryptographic links 60 between two contiguous blocks 40 of the series of blocks 40 of the autonomous data blockchain 20 comprises the first cryptographic link 61 and the second cryptographic link 62.

The first cryptographic link 61 links the first status 403 of the previous block 41 with the first status 403 of the following block 42.

The second cryptographic link 62 links the second status 404 of the previous block 41 with the second status 404 of the following block 42 or links the second status 404 of the previous block 41 with the first status 403 of the following block 42.

As shown in FIG. 2 both states 403, 404 of the previous block 41 are reported in the following block 42 and in this way the block 40 is validated within the autonomous data blockchain 20, in which the validated block 40 comprises both the first status 403 and the second status 404.

Advantageously, each block 40 of the series of blocks 40 of the autonomous data blockchain 20 represents a minimum cancellable entity, as if it were a record of a table of a database, or a file of a data archive.

Advantageously, the pair of cryptographic links 60 linking two contiguous blocks 40 of the series of blocks 40 of the autonomous data blockchain 20 allows for the cancellation of data present within the archive data 402 of the block 40, as opposed to what happens for blockchains of the state of the prior art.

As shown in FIG. 3 in order to prevent data cancellation inside the data archive 402 it is sufficient to insert inside the following block 42 a single status value, for example the first status 403 that is valid for both the cryptographic links 61, 62 of the pair of cryptographic links 60.

The single participant 201 feeds new blocks 40 by linking them by means of the two cryptographic links 60 to the series of blocks 40 of the autonomous data blockchain 20.

Advantageously, the autonomous data blockchain 20 is completely and autonomously managed by a single participant 201 of the cryptographic system 200 and consequently does not require a distributed or central consensus from other participants 201 of the set 200 to validate a new block 40 of the series of blocks 40 of the autonomous data blockchain 20.

Advantageously, the writing of new blocks 40 or of new data inside existing blocks 40 is not shared with any other participant 201 of the cryptographic system 200.

Advantageously, the cryptographic system 200 according to the present invention allows any type of data to be inserted inside the archive 402 thanks to the completely autonomous management of the archive 402.

Advantageously, the cryptographic system 200 allows to reach an adequate number of data insertions processed per second by the entire autonomous blockchain system 10, 20 and also by the single participant 201 thanks to the lack of consensus in adding new blocks 40 inside their own autonomous data blockchain 20.

To provide immutability and verifiability to the data inserted into the autonomous data blockchain, each set of blockchains 100 provides that at least one control block 30 of said at least one control block 10 is linked with at least one block 40 of said at least one autonomous data blockchain 20 by an inter-blockchain cryptographic link 43 and at least one control block 30 of said at least one control block 10 of said at least one first set of blockchains 100 is linked with at least one control block 30 of said at least one control block 10 of said at least one second set of blockchains 100 by an inter-blockchain cryptographic link 33.

The difference between a traditional cryptographic link and an inter-blockchain cryptographic link lies in the fact that the traditional type links two contiguous blocks within the same blockchain consisting of a single progressive index, whereas the inter-blockchain type 43 links a block 30 to one or more blocks 30 belonging to different autonomous blockchains 10, 20, and each of which with an independent index.

In order to create an inter-blockchain cryptographic link 33, it is necessary to report within a block 30 information relevant to at least the name of the blockchain 10, the index and the cryptography hash of the block 30 to which one wishes to link.

As shown schematically in FIG. 5 an autonomous data blockchain 20 of a first participant 201, 203 acquires immutability and verifiability characteristics when the control blockchain 10 of said first participant 201, 203 comprises information comprising at least titling data 401 comprising the index and the pair of cryptographic links 60 and the name of the blockchain of any block 40 of the series of blocks 40 of the autonomous data blockchain 20 of the first participant 201. The information 401, 60 is linked by an inter-blockchain cryptographic link 43 between the autonomous data block 40 of the autonomous data blockchain 20 and the control block 30 of the control blockchain 10.

The control blockchain 10 does not read the data contained in the archive 402 of the block 40 of the autonomous data blockchain 20.

Preferably, the control blockchain 10 reads the last block 40 in chronological order of the autonomous data blockchain 20.

The control blockchain 10 of the first participant 201, 203 adds a control block 30 comprising titling data 301 and archive data 302, wherein within the archive data 302 of the control block 30, 60 the information 401 previously read is transcribed. Between the control blocks 30 of the control blockchain 10 a cryptographic link 50 is provided.

The control blockchain 10 of a second participant 201, 202 comprise at least one control block 30 that is linked to at least another block 30 of the control blockchain 10 of the first participant 201, 203 by an inter-blockchain cryptographic link 33.

To allow immutability and verifiability, a double reading is envisaged in which the previous control block 30 of the set 102 reads the following control block 30 of the set 101. All the control blockchains 10 always comprise this double reading, as shown for example in FIG. 5.

Advantageously, the inter-blockchain cryptographic links 33, 43 realized also thanks to the collaboration between different participants 201 of the blockchain system 200, is to provide immutability and verifiability to all autonomous blockchains, hence also to the archived data 20, which constitute the system by exploiting the very blockchain nature, i.e., the invalidation of the chain in the face of any change made to it thanks to the property defined as the avalanche effect, a characteristic of the hash function applied to each block 30, 40.

Indeed, when the information constituting an inter-blockchain cryptographic link 33, 43 is exchanged from the control blockchain 30 of the first participant 201, 203 to the control blockchain 10 of the second participant 201, 202 and vice versa, if either of them wanted to rewrite even a single bit contained in one of its autonomous blockchains, it will be necessary to rewrite the autonomous blockchains of both sets to ensure the continuity of the hash reported within the blocks.

Alternatively if the set of blockchains 200 were constituted by thousands of participants 201 it will be necessary for thousands of participants to agree to rewrite their own autonomous blockchains if even one participant wanted to rewrite its data.

Advantageously, each data stored in a block 40 of any autonomous blockchain is associated with a time stamp, an aspect which, combined with the immutability obtained thanks to the inter-blockchain cryptographic links, allows to verify that any information cannot be back-certified by the system itself.

This requirement is considered met only if the time stamp of the blocks 40 containing the read information is prior to the time stamp of the control block 30 where such information is written and at the same time subsequent to the time stamp of the previous block 42 with respect to the block 40 where such information is written.

In essence, a block 40 of the autonomous data block 20 linked by the inter-blockchain cryptographic link 43 with a block 30 of the control blockchain 10 comprises a time stamp preceding the time stamp of the control block 30 with which it is linked.

With reference to FIG. 4, data accessibility is discussed, which is another key aspect to enable a blockchain model to be considered as a valid replacement for a company-class database.

This feature is believed to be satisfied thanks to the logical subdivision of the autonomous blockchains into data type and control type.

Advantageously, the set of blockchains 100 comprising two autonomous blockchains 10 and 20 enable securing the data within the archive 402 of the autonomous data blockchain 20 of the company by exporting only a portion of the information outside the company through the control blockchain 10 that is exposed to the public or only privately accessible to other participants 201 of the cryptographic system 200.

Advantageously, it is also possible to manage the same type of accessibility for the autonomous data blockchain.

Advantageously, the logical layout offered by the two autonomous blockchains 10, 20 further allows building multiple scenarios under complete management of a single participant 201, including the ability to create and link more autonomous data blockchains 20 to a single control blockchain 10, or more autonomous data blockchains 20 to more control blockchains 10 or even a control blockchain 10 to more control blockchains 10 and so on.

Advantageously, the cryptographic system 200 allows to be highly scalable worldwide given the lack of data replication from one blockchain to another one produced by the autonomous data management.

Advantageously, the cryptographic system 200 enables compliance with the data access management as defined by the requirements described by HIPAA thanks to the management of autonomous blockchains 10, 20 and to the logical distinction into two blockchains 10, 20 for each participant 201 that are dedicated to different purposes, individually placeable and possibly subject to controlled access.

Advantageously, the cryptographic system 200 allows the abandonment of levels of security delegated to game theory thanks to the achievement of immutability and verifiability without using tokens/cryptocurrencies.

Advantageously, the cryptographic system 200 reaches a high level of maintainability thanks to the possibility of defining more autonomous data blockchains 20 per data feature that are linked to a single or more control blockchains 10.

Advantageously, inserting data and making them immutable are two operations at the total discretion of each single participant 201. For example, as regards data related to a production of goods, it is sufficient to make the autonomous data blockchain 20 immutable before shipping the produced goods towards the next point of the supply chain. For example, for data related to property transfer or to official currency transactions, it is instead necessary to make the blockchain 20 immutable more frequently in order to make this inserted information immutable and verifiable as soon as possible.

Advantageously, the cryptographic system 200 according to the present invention defines a new blockchain model opposite to the characteristics of the current model in use defined "DLT", that is a model describable as "distributed autonomous ledger technology", in which each participant in the set regulated by the same method according to the present invention, possesses its own version of archive made immutable and verifiable thanks to a network of cryptographic links, in continuous temporal progression, which indissolubly unites the archives of all the participants to the same system.

Alternatively, it is possible to provide that the set of blockchains 100 managed by the single participant 201 comprises a multiplicity of autonomous control blockchains 10 comprising or not a multiplicity of autonomous data blockchains 20. In FIG. 4, for example, it is shown that the set of blockchains 100 depicted above comprises two autonomous data blockchains 20 and a single control blockchain 10 linked with both of said two autonomous data blockchains 20.

The system also provides for the association between autonomous blockchain 10, 20 and participant 201 as a requirement, so that the control blockchain 10 is uniquely and reliably referable to a participant 201. For this reason, by exploiting systems already present in the internet infrastructure, i.e. for example domain names and PKI, it will be sufficient that the domain name contained in the URL used to contact the set of blockchains 100 is the same as the one used in the digital certificates issued by a public CA that are used to encrypt the value useful to establish the cryptographic link between blocks 30, 40. In this case the cryptographic link 50, 60 between blocks 30, 40 must be signed by a private key of an asymmetrical certificate with the above characteristics. The control blockchain 10, in addition to certifying the immutability of the information archived in the entire system, must therefore also keep the series of public keys of the asymmetrical certificates, own and optionally of all the autonomous control blockchains of other linked sets, used for signing the cryptographic links that make up the autonomous control blockchain itself. In fact, the use of PKI makes it possible to verify at the same time the actual name of the participant 101, and consequently the identity, associated to the control blockchain 10 managed by the participant 100, the integrity of the control blockchain 10 even in offline mode with respect to an encrypted communication with the administrator of the same and finally the association between time stamp and signed data; together with the control of the hashes that make up the cryptographic links 50, 60 between blocks 30, 40, of the time progression of the time stamps, of the order of the indexes and of the formatting of the blocks 30, 40 it is possible to obtain the complete verifiability of the autonomous blockchains 10, 20.

The use of certificates can be compared to that of anonymous wallets used in blockchains such as Bitcoin or Ethereum, but in this case they are issued and guaranteed by public CAs.

Advantageously, the use of asymmetrical certificates issued by public CA in a client-server communication allows for the legal identification of the single parties.

The autonomous data blockchain 20, as a blockchain with non-systemic importance, but for the exclusive use of the participant 201 that manages it, does not need the same restrictions used for the control blockchain 10 if not exposed on the Internet, it will therefore be sufficient that the name is not already in use by another autonomous data blockchain 20 linked to the same control blockchain 10, for example by exploiting the levels of the domains to create a hierarchy between the two different autonomous blockchains, for example if we called the autonomous control blockchain bc.organisation.com, we could call the autonomous data blockchains linked to it data1.bc.organisation.com, data2.bc.organisation.com, and so on.

Advantageously, to enable a further level of verifiability of the blockchains 10, 20 it is also possible to initialise the genesis block of a blockchain with one's own domain name/URL and/or the public key of an asymmetrical certificate.

Advantageously, the cryptographic system 200 allows defining a DPO as defined by the requirements described by GDPR given the data insertion by a single participant 201 identifiable through public asymmetrical certificates.

Since asymmetrical certificates can also be of the ECDSA type, therefore with an amount of bytes in output not correlated to the amount of bytes in input to the cryptographic function, it is necessary to introduce inside the block a field, or in any case a piece of information, related to the type of function used to establish the cryptographic link between blocks (ex: "1" corresponds to sha254)

Advantageously, the use of this field allows the cryptographic system 200 to be easily updated over time thanks to the information relevant to the type of cryptographic function, already developed or yet to be developed, used to calculate the link between blocks 40.

The control blockchain 10 is a blockchain archive that is functionally different from the autonomous data blockchain 20 and is realized according to the following specifications. The control blockchain 10 must be developed in compliance with the model of the chain of blocks, which in turn are organised into fields, continuously growing and serially linked to each other, in chronological order from the least recent to the most recent, through the application of cryptographic algorithms. Each control block 30 that constitutes the control blockchain 10 must report at least the information relevant to index, time stamp, cryptographic link signed by public CA, the information exchanged by the inter-blockchain cryptographic links 33, 43, and the type of function used to encrypt the link between blocks 30. The control blockchain 10 must be completely managed by a single participant 201 and consequently does not require a distributed or central consensus from other participants 201 to validate a new block 30, but more simply the control blockchain 10 is fed by new blocks 30 linked by the participant 201. Writing new data/blocks 30 is not shared with any other participant 201. The control blockchain 10 must be part of the cryptographic system 200 including multiple autonomous control blockchains 10, each of which contains exchanged data, i.e. the inter-blockchain cryptographic links 33, 43. The control blockchain 10 must be identifiable and contactable via internet network 300 through its own internet-wide unique URL. The domain of the URL will preferably be the same as the one used in the request for the asymmetrical certificate used to sign the cryptographic links between blocks 30 and the same as the one used in the genesis block. The control blocks 30 must be linked to each other with a single cryptographic link 50. Upon each asymmetrical certificate renewal, the public key associated with it will be archived within the control blockchain 10.

It is also possible to define a cryptographic method archiving data by a cryptographic system 200 according to the above discussion, wherein said method comprises at least a data write operation in a block 40 of one of the autonomous data blockchain 20 of a set of blockchains 100, at least a verification operation of the data linking the block 40 of the autonomous data blockchain 20 comprising data by an inter-blockchain cryptographic link 43 with a block 30 of the autonomous control blockchain 10 comprising a time stamp more recent than the block 40 of the autonomous data blockchain 20, at least a data cancellation operation of a block 40, inserting inside the following block 42 two status values for each one of the pair of cryptographic links 61, 62 of the pair of cryptographic links 60, thus defining from a set block 40 of the autonomous data blockchain 20 onwards, that the valid value of said second status 404 indicates that said archive 402 is empty, validating this value in a following block 30 of the autonomous control blockchain 10 with a following time stamp.

The method also comprises an operation to prevent a data cancellation inside the archive data 402, inserting inside the following block 42 a single valid status value for both the cryptographic links 61, 62 of the pair of cryptographic links 60.

The method is implementable by means of a computer program comprising instructions for carrying out the method performed by the cryptographic system of the present invention.

Advantageously, the cryptographic system allows to provide immutability and verifiability to the set of blockchains 100 in a distributed way, having allowed to choose any participant 201 of the cryptographic system 200, allowing to choose any public CA for issuing a certificate and having provided the impossibility in taking control over the set of blockchains 100 or one or more autonomous blockchains 20 that are not their own.

The invention thus conceived is susceptible to many modifications and variants, all falling within the same inventive concept. In practice, the materials used, as well as their dimensions, can be of any type according to the technical requirements.

The invention claimed is:
1. A method for archiving data in a distributed cryptographic database comprising multiple sets of blockchains, the database being on a network of computers, the network of computers comprising at least one client and at least one server, the method comprising:

a data write operation comprising writing data to a data archive of a data block of an autonomous data blockchain of a first set of blockchains;

a verification operation comprising linking the data block comprising written data with a control block of an autonomous control blockchain of the first set of blockchains by a first inter-blockchain cryptographic link, the control block comprising a time stamp more recent than a time stamp of the data block with which it is linked; and a data cancellation operation comprising, when the written data is to be cancelled:
  inserting a first status value and a second status value inside a following data block, the following data block being linked to the data block comprising data by a pair of cryptographic links, each of the two status values corresponding to a respective one of the pair of cryptographic links, thus defining that, from a certain block of the autonomous data blockchain onwards, a valid second status value indicates that the data archive is empty; and
  validating the second status value in a following control block of the autonomous control blockchain with a time stamp;

wherein:
the multiple sets of blockchains comprise at least the first set of blockchains and a second set of blockchains;
the first set of blockchains comprises the control blockchain and the autonomous data blockchain;
the second set of blockchains comprises a control blockchain;
each of the control blockchains comprises a series of control blocks and a series of cryptographic control links linking the control blocks in series in chronological order;
the autonomous data blockchain comprises a series of data blocks and a series of pairs of cryptographic links linking the data blocks in series in chronological order;
each data block of the series of data blocks comprises:
  titling data comprising at least one index and at least one time stamp;
  a data archive;
  a first status of the data archive; and
  a second status of the data archive;
the first status indicates that the data archive comprises at least one archived data and a validity period relevant to the at least one archived data if applicable;
the second status indicates that the data archive is empty if applicable;
the series of data blocks comprises at least one previous data block and at least one following data block which is more recent than the previous data block;
the at least one previous data block and the at least one following data block are contiguous data blocks of the series of data blocks, the contiguous data blocks being linked with each other by a pair of cryptographic links of the series of pairs of cryptographic links;
the pair of cryptographic links comprises a first cryptographic link and a second cryptographic link;
the first cryptographic link links the first status of the previous data block with the first status of the following data block;
the second cryptographic link links the second status of the previous data block with the second status of the following data block or links the second status of the previous data block with the first status of the following data block;

at least one control block of the control blockchain of the first set of blockchains is linked with at least one data block of the autonomous data blockchain by a first inter-blockchain cryptographic link; and at least one control block of the control blockchain of the first set of blockchains is linked with at least one control block of the control blockchain of the second set of blockchains by a second inter-blockchain cryptographic link.

2. The method according to claim 1, further comprising:
a data cancellation prevention operation comprising, when the written data is not to be cancelled, inserting a single status value inside the following data block corresponding to both of the pair of cryptographic links.

3. A distributed cryptographic database comprising multiple sets of blockchains, wherein:
the database is on a network of computers;
the network of computers comprises at least one client and one server configured to communicate with each other;
the multiple sets of blockchains comprise at least one first set of blockchains and at least one second set of blockchains;
the at least one first set of blockchains comprises at least one control blockchain and at least one autonomous data blockchain;
the at least one second set of blockchains comprises at least one control blockchain;
each of the at least one control blockchains comprises a series of control blocks and a series of cryptographic control links linking the control blocks in series in chronological order;
the at least one autonomous data blockchain comprises a series of data blocks and a series of pairs of cryptographic links linking the data blocks in series in chronological order;
each data block of the series of data blocks comprises:
 titling data comprising at least one index and at least one time stamp;
 a data archive;
 a first status of the data archive; and
 a second status of the data archive;
the first status indicates that the data archive comprises at least one archived data and a validity period relevant to the at least one archived data if applicable;
the second status indicates that the data archive is empty if applicable;
the series of data blocks comprises at least one previous data block and at least one following data block which is more recent than the previous data block;
the at least one previous data block and the at least one following data block are contiguous data blocks of the series of data blocks, the contiguous data blocks being linked with each other by a pair of cryptographic links of the series of pairs of cryptographic links;
the pair of cryptographic links comprises a first cryptographic link and a second cryptographic link;
the first cryptographic link links the first status of the previous data block with the first status of the following data block;
the second cryptographic link links the second status of the previous data block with the second status of the following data block or links the second status of the previous data block with the first status of the following data block;

at least one control block of the at least one control blockchain of the first set of blockchains is linked with at least one data block of the at least one autonomous data blockchain by a first inter-blockchain cryptographic link; and at least one control block of the at least one control blockchain of the at least one first set of blockchains is linked with at least one control block of the at least one control blockchain of the at least one second set of blockchains by a second inter-blockchain cryptographic link.

4. The database according to claim 3, wherein:
the second inter-blockchain cryptographic link links a control block of the at least one control blockchain of the first set of blockchains with one or more control blocks of the at least one control blockchain of the second set of blockchains;
each control blockchain comprises an independent index;
each control block of each control block chain comprises information relevant to the control block to which it is linked via the second inter-blockchain link; and
the information comprises a name of the autonomous control blockchain, an index, and a cryptography hash.

5. The database according to claim 3, wherein:
the at least one control blockchain of the first set of blockchains comprises information;
the information comprises at least titling data comprising the index, the pair of cryptographic links, and a name of any of the series of data blocks of the at least one autonomous data blockchain; and
the information is linked via the first cryptographic link between the at least one data block and the at least one control block.

6. The database according to claim 5, wherein:
the control blockchain of the first set of blockchains comprises an added control block comprising titling data and a data archive;
within the data archive of the added control block is transcribed information read from a previously added control block; and
the added control block and the previously added control block are linked by one of the series of cryptographic links.

7. The database according to claim 3, wherein a data block of the autonomous data blockchain linked by the inter-blockchain cryptographic link with a control block of the control blockchain comprises a time stamp preceding a time stamp of the control block with which it is linked.

8. The database according to claim 3, wherein:
each of the cryptographic control links linking the control blocks is signed by a private key of an asymmetrical certificate;
each of the pairs of cryptographic links linking the data blocks is signed by a private key of an asymmetrical certificate; and
the control blockchain comprises a public key of its own asymmetrical certificate and optionally a public key of all linked autonomous control blockchains.

9. The database according to claim 3, wherein each control block of each of the least one control blockchains comprises information relevant to index, a time stamp, a cryptographic link signed by public CA, information exchanged by inter-blockchain cryptographic link, and a type of function used to encrypt the link between control blocks.

* * * * *